United States Patent
Ziegler et al.

(10) Patent No.: US 10,461,557 B2
(45) Date of Patent: Oct. 29, 2019

(54) RECHARGEABLE TOOL BATTERY, MAINS-OPERABLE HAND-HELD POWER TOOL, AND TOOL SYSTEM

(71) Applicant: Hilti Aktiengesellschaft, Schaan (LI)

(72) Inventors: Bernd Ziegler, Hiltenfingen (DE); Holger Cecchin, Puchheim (DE); Ralf Meixner, Germaringen (DE)

(73) Assignee: Hilti Aktiengesellschaft, Schaan (LI)

( * ) Notice: Subject to any disclaimer, the term of this patent is extended or adjusted under 35 U.S.C. 154(b) by 42 days.

(21) Appl. No.: 15/555,882

(22) PCT Filed: Mar. 10, 2016

(86) PCT No.: PCT/EP2016/055113
§ 371 (c)(1),
(2) Date: Sep. 5, 2017

(87) PCT Pub. No.: WO2016/142461
PCT Pub. Date: Sep. 15, 2016

(65) Prior Publication Data
US 2018/0041062 A1 Feb. 8, 2018

(30) Foreign Application Priority Data
Mar. 10, 2015 (EP) .................................... 15158345

(51) Int. Cl.
*H02J 7/00* (2006.01)
*B25F 5/00* (2006.01)
(Continued)

(52) U.S. Cl.
CPC .............. *H02J 7/0065* (2013.01); *B25F 5/00* (2013.01); *H02J 7/022* (2013.01); *H02M 3/04* (2013.01); *H02M 7/04* (2013.01)

(58) Field of Classification Search
CPC ....... Y02E 60/12; H02J 7/0044; H02J 7/0042; H02J 7/0045; H01M 2/1022
See application file for complete search history.

(56) References Cited

U.S. PATENT DOCUMENTS 2,736,311 A 2/1956 Coates
5,305,729 A 4/1994 Chiuminatta et al.
(Continued)

FOREIGN PATENT DOCUMENTS

EP 0951 135 10/1999
JP 2011 148 069 8/2011

OTHER PUBLICATIONS

"Quantensprung: Akku und Netz in einem Bohrhammer," Mar. 1, 2012, 5 pages including English machine translation.

*Primary Examiner* — Arun C Williams
(74) *Attorney, Agent, or Firm* — Davidson, Davidson & Kappel, LLC

(57) ABSTRACT

A rechargeable tool battery (200), in particular for supplying a hand-held power tool (100), including a rechargeable tool battery housing (290), inside which a secondary cell battery (210) having a nominal cell voltage (UN) is situated, the rechargeable tool battery (200) including a rechargeable battery DC-DC converter (220), integrated into the rechargeable tool battery housing (290), which is electrically connected to the secondary cell battery (210), and is designed for raising the nominal cell voltage (UN) to a supply voltage (UV) which is tappable at a rechargeable tool battery terminal (295) of the rechargeable tool battery (200).

12 Claims, 1 Drawing Sheet

(51) Int. Cl.
*H02J 7/02* (2016.01)
*H02M 3/04* (2006.01)
*H02M 7/04* (2006.01)

(56) References Cited

U.S. PATENT DOCUMENTS

| | | | |
|---|---|---|---|
| 5,715,156 A | | 2/1998 | Yilmaz et al. |
| 6,191,554 B1 * | | 2/2001 | Nakane .................. H02J 7/0057 320/107 |
| 6,229,280 B1 * | | 5/2001 | Sakoh .................. G01R 31/3682 320/106 |
| 2003/0173940 A1 | | 9/2003 | Kovarik et al. |
| 2005/0194929 A1 * | | 9/2005 | Funabashi .................. B25F 5/00 320/114 |
| 2008/0238370 A1 * | | 10/2008 | Carrier ................ H01M 2/1022 320/134 |
| 2014/0001993 A1 * | | 1/2014 | Iwata ...................... H02P 27/04 318/400.26 |
| 2014/0224237 A1 | | 8/2014 | Ronzello et al. |

* cited by examiner

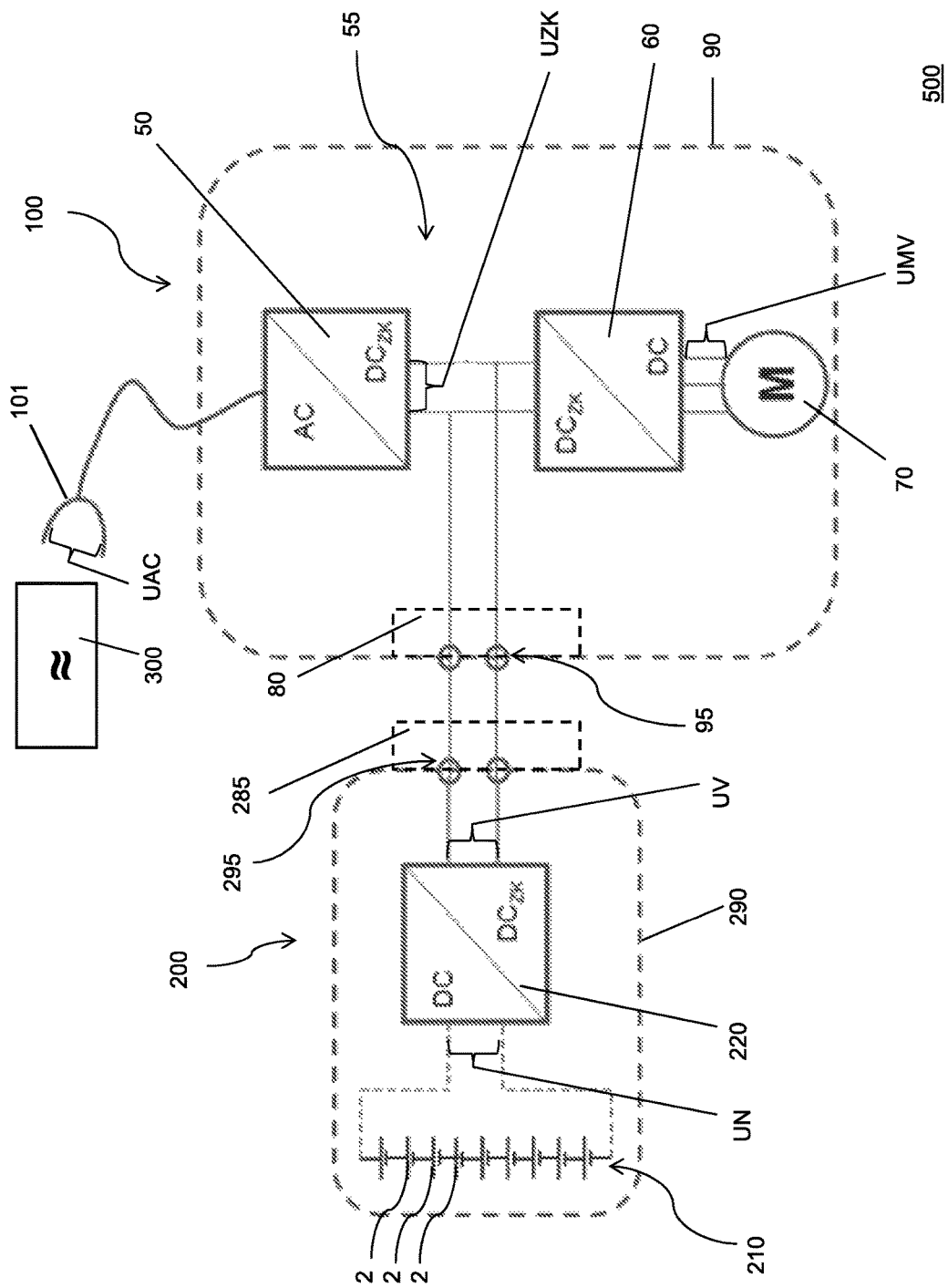

RECHARGEABLE TOOL BATTERY, MAINS-OPERABLE HAND-HELD POWER TOOL, AND TOOL SYSTEM

The present invention relates to a rechargeable tool battery, in particular for supplying a hand-held power tool such as, for example, a hammer drill or a combi-hammer. The rechargeable tool battery includes a rechargeable tool battery housing, inside which a secondary cell battery having a nominal cell voltage is situated.

The present invention also relates to a mains-operable hand-held power tool, in particular a hammer drill or a combi-hammer, including a tool housing and an electrical drive motor situated therein. The hand-held power tool includes a rectifier (AC-DC converter) which is connectable on the input side to an AC voltage network and is designed for converting a mains AC voltage into an intermediate circuit DC voltage of an intermediate circuit of the hand-held power tool. The hand-held power tool further includes a motor DC-DC converter which is connected on the input side to the rectifier and on the output side to the electrical drive motor. The DC-DC converter is designed for converting the intermediate circuit DC voltage into a motor supply voltage.

Moreover, the present invention relates to a tool system including a mains-operable hand-held power tool and a rechargeable tool battery.

SUMMARY OF THE INVENTION

It is an object of the present invention to provide a rechargeable tool battery, a mains-operable hand-held power tool, and a tool system, which offer an expanded range of use.

With respect to the rechargeable tool battery, the rechargeable tool battery includes a rechargeable battery DC-DC converter which is integrated into the rechargeable tool battery housing, is electrically connected to the secondary cell battery, and is designed for raising the nominal cell voltage to a supply voltage which is tappable at a rechargeable tool battery terminal of the rechargeable tool battery.

Advantageously, a rechargeable tool battery having a predefined nominal cell voltage may now be used for supplying hand-held power tools which are to be operated, for example, using an intermediate circuit DC voltage which is above a typical nominal cell voltage of a rechargeable tool battery. Due to the rechargeable battery DC-DC converter integrated into the rechargeable tool battery housing, a nominal cell voltage of the secondary cell battery of the rechargeable tool battery may be advantageously raised to a supply voltage which corresponds to an intermediate circuit DC voltage of a hand-held power tool, in particular a mains-operable hand-held power tool.

In one preferred embodiment, the nominal cell voltage is less than 42 volts. The rechargeable tool battery is therefore particularly reliably manufacturable. Particularly preferably, the supply voltage to which the nominal cell voltage is raised by the rechargeable battery DC-DC converter, which is integrated into the rechargeable tool battery housing, is more than 42 volts. The present invention incorporates the finding, in this regard, that intermediate circuit DC voltages of mains-operable hand-held power tools are advantageously above the safety extra-low voltage of 42 volts. A mains-operable hand-held power tool may now be supplied independently of the mains with the aid of a rechargeable tool battery.

It has proven advantageous when the secondary cell battery is made up of secondary cells connected in series. This provides for a simple installation of the rechargeable tool battery. Preferably, the nominal cell voltage corresponds to the sum of the nominal voltages of the series-connected secondary cells. Particularly preferably, the nominal cell voltage is between 35 volts and 37 volts. The nominal cell voltage may be 36 volts. Preferably, the secondary cell battery is formed from lithium-ion secondary cells.

In one particularly preferred refinement, the rechargeable tool battery terminal is situated on an outer surface of the rechargeable tool battery housing. In this way, the rechargeable tool battery terminal is easily accessible and may be connected to a complementary supply terminal of a hand-held power tool.

In one preferred embodiment, the supply voltage is exclusively tappable at the rechargeable tool battery. Preferably, the rechargeable tool battery includes precisely one rechargeable tool battery terminal, at which the supply voltage is tappable. Alternatively, the rechargeable tool battery may be designed in such a way that the nominal cell voltage, in addition to the supply voltage, is externally tappable at the rechargeable tool battery.

It has proven advantageous when the nominal cell voltage is raised to the supply voltage exclusively by way of the rechargeable battery DC-DC converter. Particularly preferably, the rechargeable tool battery and/or the secondary cell battery are/is free from an electrical bridge circuit. The rechargeable tool battery is therefore also particularly low-wear.

In one particularly preferred refinement, the supply voltage is adapted to an intermediate circuit DC voltage of an intermediate circuit of a hand-held power tool.

With respect to the mains-operable hand-held power tool, the hand-held power tool includes a supply terminal which is electrically connected to the intermediate circuit, via which the hand-held power tool is suppliable, independently of the mains, with a supply voltage of a rechargeable tool battery.

Advantageously, a mains-operable hand-held power tool, which is designed, for example, for a 230-volt AC voltage mains operation, may now be supplied directly with a direct current from a rechargeable tool battery in that the direct current is supplied via the supply terminal into the intermediate circuit of the hand-held power tool. Advantageously, a voltage which has the same absolute value as an intermediate circuit DC voltage of the hand-held power tool during the 230-volt mains operation is supplied into the supply terminal. It is now possible to also operate a hand-held power tool, which is designed for mains operation, independently of the mains with the aid of a rechargeable tool battery. In one preferred embodiment, the rectifier is designed in such a way that the intermediate circuit DC voltage of the intermediate circuit in the 230-volt mains operation is greater than 42 volts. Preferably, the value of the intermediate circuit DC voltage of the intermediate circuit during the 230-volt mains operation is greater than or equal to the value of the motor voltage.

In one particularly preferred refinement, the tool housing includes a receiving bay designed for exchangeably accommodating a rechargeable tool battery. The supply terminal may be situated within the receiving bay which is designed for exchangeably accommodating a rechargeable tool battery.

Particularly preferably, the supply terminal is electrically connected exclusively to the intermediate circuit of the hand-held power tool.

With respect to the tool system, a tool system includes an above-described, mains-operable hand-held power tool and an above-described rechargeable tool battery. The supply voltage, which is tappable at the rechargeable tool battery terminal of the rechargeable tool battery, preferably corresponds to the intermediate circuit DC voltage of the intermediate circuit of the hand-held power tool during mains operation.

BRIEF DESCRIPTION OF THE DRAWINGS

Further advantages result from the following description of the drawing. An exemplary embodiment of the present invention is represented in the drawing; the drawing, the description, and the claims include numerous features and combinations. Those skilled in the art will advantageously also consider the features individually and combine them to form other meaningful combinations.

FIG. 1 shows a schematic representation of a rechargeable tool battery according to the present invention together with a mains-operable hand-held power tool according to the present invention.

DETAILED DESCRIPTION

FIG. 1 shows a rechargeable tool battery 200 according to the present invention, which is connected to a mains-operable hand-held power tool 100 according to the present invention. Rechargeable tool battery 200 and hand-held power tool 100 form a tool system 500 according to the present invention.

Rechargeable tool battery 200 in FIG. 1 includes a rechargeable tool battery housing 290 including a secondary cell battery 210 situated therein. Secondary cell battery 210 is made up of series-connected secondary cells 2. In the present case, secondary cells 2 are lithium-ion secondary cells and are exclusively connected in series. A nominal cell voltage UN of secondary cell battery 210 is 36 volts in this case. A rechargeable battery DC-DC converter 220 is integrated within rechargeable tool battery housing 290. The rechargeable tool battery DC voltage converter is electrically connected on the input side to secondary cell battery 210. On the output side, rechargeable battery DC-DC converter 220 is electrically connected to a rechargeable tool battery terminal 295 which, in the present case, is situated on an outer surface of rechargeable tool battery housing 290. As is also apparent from FIG. 1, rechargeable tool battery housing 290 includes, on its surface, a mechanical interface 285 which is designed to be complementary to a receiving bay 80 of mains-operable hand-held power tool 100 in the present case.

Rechargeable battery DC-DC converter 220 integrated into rechargeable tool battery housing 290 is designed, in the present case, for raising nominal cell voltage UN from 36 volts to a supply voltage UV which is 150 volts in the present example and therefore corresponds to an intermediate circuit DC voltage UZK of an intermediate circuit 55 of hand-held power tool 100 during mains operation.

Mains-operable hand-held power tool 100 from FIG. 1 is a schematically represented combi-hammer in the present case. Hand-held power tool 100 includes a tool housing 90 including an electrical drive motor 70 situated therein. Hand-held power tool 100 also includes a rectifier 50 which is connectable, on the input side, to an AC voltage network 300. In the present case, rectifier 50 is connectable to AC voltage network 300 via an electrical connection cable including a power plug 101. Rectifier 50 is designed for converting a mains AC voltage UAC of 230 volts in this case into an intermediate circuit DC voltage UZK of an intermediate circuit 55 of hand-held power tool 100. Rectifier 50 is designed in such a way that intermediate circuit DC voltage UZK of intermediate circuit 55 during the 230-volt mains operation is greater than 42 volts. As mentioned at the outset, intermediate circuit DC voltage UZK of intermediate circuit 55 is 150 volts in the present example.

Hand-held power tool 100 further includes a motor DC-DC converter 60 which is electrically connected on the input side to rectifier 50 and at the output side to an electrical drive motor 70. DC-DC converter 60 is designed for converting intermediate circuit DC voltage UZK into a motor supply voltage UMV.

As may also be gathered from FIG. 1, hand-held power tool 100 includes a supply terminal 95 which is electrically connected to intermediate circuit 55. Hand-held power tool 100 may be supplied independently of the mains, via supply terminal 95, with supply voltage UV of rechargeable tool battery 200. In the present example, the mains-operable hand-held power tool includes precisely one supply terminal 95 which is electrically connected exclusively to intermediate circuit 55.

Tool housing 90 of mains-operable hand-held power tool 100 includes a receiving bay 80 which was mentioned at the outset and is designed for exchangeably accommodating rechargeable tool battery 200. In the present case, supply terminal 95 is situated on a surface of receiving bay 80, so that rechargeable tool battery 200, when accommodated via its mechanical interface 285 in receiving bay 80, is simultaneously also electrically connected via its rechargeable tool battery terminal 295 to supply terminal 95 of hand-held power tool 100.

Mains-operable hand-held power tool 100 and rechargeable tool battery 200 form a tool system 500, supply voltage UV, which is tappable at rechargeable tool battery terminal 295, corresponding to intermediate circuit DC voltage UZK of the intermediate circuit of the hand-held power tool during mains operation. Hand-held power tool 100, which is designed for mains operation with 230 volts, may therefore be supplied independently of the mains by way of rechargeable tool battery 200.

LIST OF REFERENCE NUMERALS

UAC mains AC voltage
UMV motor supply voltage
UN nominal cell voltage
UV supply voltage
UZK intermediate circuit DC voltage
2 secondary cells
50 rectifier
55 intermediate circuit
60 motor DC-DC converter
70 electrical drive motor
80 receiving bay
90 tool housing
95 supply terminal
100 hand-held power tool
101 power plug
200 rechargeable tool battery
210 secondary cell battery
220 rechargeable battery DC-DC converter
285 mechanical interface
290 rechargeable tool battery housing 295 rechargeable tool battery terminal
300 AC voltage network
500 tool system

The invention claimed is:

1. A rechargeable tool battery comprising:
a rechargeable tool battery housing, a secondary cell battery being situated inside the battery housing and having a nominal cell voltage; and
a rechargeable battery DC-DC converter integrated into the rechargeable tool battery housing and electrically connected to the secondary cell battery, and designed for raising the nominal cell voltage to a supply voltage tappable at a rechargeable tool battery terminal of the rechargeable tool battery.

2. The rechargeable tool battery as recited in claim 1 wherein the nominal cell voltage is less than 42 volts and the supply voltage is more than 42 volts.

3. The rechargeable tool battery as recited in claim 1 wherein the secondary cell battery is made up of series-connected secondary cells and the nominal cell voltage is the sum of the nominal voltages of the series-connected secondary cells.

4. The rechargeable tool battery as recited in claim 1 wherein the rechargeable tool battery terminal is situated on an outer surface of the rechargeable tool battery housing.

5. The rechargeable tool battery as recited in claim 1 wherein the nominal cell voltage is raised to the supply voltage exclusively by way of the rechargeable battery DC-DC converter, and the rechargeable tool battery or the secondary cell battery is free of an electrical bridge circuit.

6. The rechargeable tool battery as recited in claim 1 wherein the supply voltage is adapted to an intermediate circuit DC voltage of an intermediate circuit of a hand-held power tool.

7. The rechargeable tool battery as recited in claim 1 wherein the rechargeable tool battery is for supplying a hand-held power tool.

8. A mains-operable hand-held power tool comprising:
a tool housing;
an electrical drive motor situated in the tool housing;
a rectifier connectable on an input side to an AC voltage network and designed for converting a mains AC voltage into an intermediate circuit DC voltage of an intermediate circuit of the hand-held power tool;
a motor DC-DC converter connected on a converter input side to the rectifier and on a converter output side to the electrical drive motor and designed for converting the intermediate circuit DC voltage into a motor supply voltage;
a supply terminal electrically connected to the intermediate circuit, the the supply terminal being suppliable, independently of mains, with a supply voltage tappable at a rechargeable tool battery terminal of a rechargeable tool battery, the rechargeable tool battery including a rechargeable tool battery housing, a secondary cell battery being situated inside the battery housing and having a nominal cell voltage; and a rechargeable battery DC-DC converter integrated into the rechargeable tool battery housing and electrically connected to the secondary cell battery, and designed for raising the nominal cell voltage to the supply voltage.

9. The mains-operable hand-held power tool as recited in claim 8 wherein the rectifier is designed in such a way that the intermediate circuit DC voltage of the intermediate circuit during a 230-volt mains operation is greater than 42 volts.

10. The mains-operable hand-held power tool as recited in claim 8 wherein the tool housing includes a receiving bay designed for exchangeably accommodating the rechargeable tool battery.

11. A hammer drill or a combi-hammer comprising the mains-operable hand-held power tool as recited in claim 8.

12. The mains-operable hand-held power tool as recited in claim 8 wherein the supply voltage tappable at the rechargeable tool battery terminal of the rechargeable tool battery corresponds to the intermediate circuit DC voltage of the intermediate circuit of the hand-held power tool during mains operation.

* * * * *